United States Patent
Nomaru et al.

(10) Patent No.: US 8,049,134 B2
(45) Date of Patent: Nov. 1, 2011

(54) LASER PROCESSING MACHINE

(75) Inventors: Keiji Nomaru, Ota-Ku (JP); Hitoshi Hoshino, Ota-ku (JP); Koji Yamaguchi, Ota-ku (JP)

(73) Assignee: Disco Corporation, Tokyo (JP)

( * ) Notice: Subject to any disclaimer, the term of this patent is extended or adjusted under 35 U.S.C. 154(b) by 820 days.

(21) Appl. No.: 12/110,916

(22) Filed: Apr. 28, 2008

(65) Prior Publication Data

US 2008/0290078 A1 Nov. 27, 2008

(30) Foreign Application Priority Data

May 22, 2007 (JP) .................................. 2007-135783

(51) Int. Cl.
*B23K 26/067* (2006.01)
*H01L 21/301* (2006.01)
(52) U.S. Cl. ............................. 219/121.68; 219/121.77
(58) Field of Classification Search ............. 219/121.67–121.77; 438/460, 438/463
See application file for complete search history.

(56) References Cited

U.S. PATENT DOCUMENTS

| 4,329,056 A * | 5/1982 | Lacombat et al. ............ 356/460 |
| 5,898,500 A * | 4/1999 | Canteloup et al. ............ 356/492 |
| 7,425,471 B2 * | 9/2008 | Bruland et al. ............... 438/130 |
| 7,666,759 B2 * | 2/2010 | Couch et al. .................. 438/463 |
| 2005/0279736 A1 * | 12/2005 | Bruland et al. ............ 219/121.8 |
| 2006/0289410 A1 * | 12/2006 | Morita et al. ............ 219/121.67 |

FOREIGN PATENT DOCUMENTS

| JP | A 10-305420 | 11/1998 |
| JP | 2005152970 A * | 6/2005 |

\* cited by examiner

*Primary Examiner* — Samuel M Heinrich
(74) *Attorney, Agent, or Firm* — Greer, Burns & Crain, Ltd.

(57) ABSTRACT

A laser processing machine having a laser beam irradiation unit is provided. The laser beam irradiation unit includes: a laser beam oscillation section; a beam splitter adapted to split the laser beam emitted from the laser beam oscillation section into a first laser beam and a second laser beam; a condenser lens adapted to condense the first and second laser beams; a prism adapted to lead the first and second laser beams split by the beam splitter to the condenser lens; a first angle-changing mirror disposed on a first optical path adapted to lead the first laser beam split by the beam splitter; a second angle-changing mirror disposed on a second optical path adapted to lead the second laser beam split by the beam splitter to the prism; and a half-wave plate disposed in the first or second optical path to allow one of respective directions of the first and second polarization planes to be aligned with the other.

2 Claims, 7 Drawing Sheets

LASER PROCESSING MACHINE

BACKGROUND OF THE INVENTION

1. Field of the Invention

The present invention relates to a laser processing machine that performs laser-processing on a wafer such as a semiconductor wafer or the like along streets formed on thereon.

2. Description of the Related Art

In a semiconductor device fabrication process, the front surface of an almost-disklike semiconductor wafer is sectioned into a plurality of areas by predetermined dividing lines called streets arranged in a lattice pattern. Devices such as ICs, LSIs or the like are formed in the areas thus sectioned. The semiconductor wafer is cut along the streets to divide the areas formed with the devices therein for fabricating the individual devices. An optical device wafer in which a light-receiving element such as a photo diode or the like or a light-emitting element such as a laser diode or the like are stacked on the front surface of a sapphire substrate or of a silicon carbide (SiC) substrate is also cut along streets and divided into individual optical devices such as light-emitting diodes, laser diodes or the like, which are widely used in electric equipment.

A method is proposed of irradiating a wafer along streets formed thereon with a laser beam to form laser processing grooves and rupturing the wafer along the laser processing grooves. See Japanese Patent Laid-open No. 10-305420 for example.

As a device is downsized, the number of devices formed in the wafer is increased to increase the number of streets, which increases the number of laser beam irradiations along the streets. Thus, a laser processing machine is required that can efficiently perform laser processing along streets.

SUMMARY OF THE INVENTION

Accordingly, an object of the present invention is to provide a laser processing machine that can simultaneously perform laser processing along two streets.

In accordance with an aspect of the present invention, there is provided a laser processing machine including: a chuck table adapted to hold a workpiece; laser beam irradiation means for applying a laser beam to the workpiece held by the chuck table; and process-transfer means for relatively process-transferring the chuck table and the laser beam irradiation means. The laser beam irradiation means includes: laser beam oscillation means for oscillating a laser beam; a beam splitter adapted to split the laser beam emitted from the laser beam oscillation means into a first laser beam having a first polarization plane and a second laser beam having a second polarization plane having a second polarization plane; a condenser lens adapted to condense the first and second laser beams split by the beam splitter; a prism disposed between the beam splitter and the condenser lens to lead the first and second laser beams split by the beam splitter to the condenser lens; first angle-changing mirror means disposed on a first optical path adapted to lead the first laser beam split by the beam splitter to change an angle through which the first laser beam is led to the prism; second angle-changing mirror means disposed on a second optical path adapted to lead the second laser beam split by the beam splitter to the prism to change an angle through which the second laser beam is led to the prism; and a half-wave plate disposed in the first or second optical path to allow one of respective directions of the first and second polarization planes to be aligned with the other of the directions.

Preferably, a rotary half-wave plate is disposed between the prism and the condenser lens.

According to the present invention, the first and second laser beams split by the beam splitter can simultaneously execute two pieces of laser processing; therefore, productivity can be improved. In addition, the laser processing machine according to the present invention can cause the first angle-changing mirror means to change the interval of irradiation positions of the first laser beam and also cause the second angle-changing mirror means to change the interval of irradiation positions of the second laser beam. Therefore, two pieces of laser processing can simultaneously be executed on the workpiece at respective process-positions.

Further, according to the laser processing machine of the present invention, one of the first and second laser beams split by the beam splitter can be allowed by the half-wave plate to have the direction of the polarization plane aligned with that of the other. The first and second laser beams can provide the same processing performance. Thus, the same two pieces of processing can simultaneously be executed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
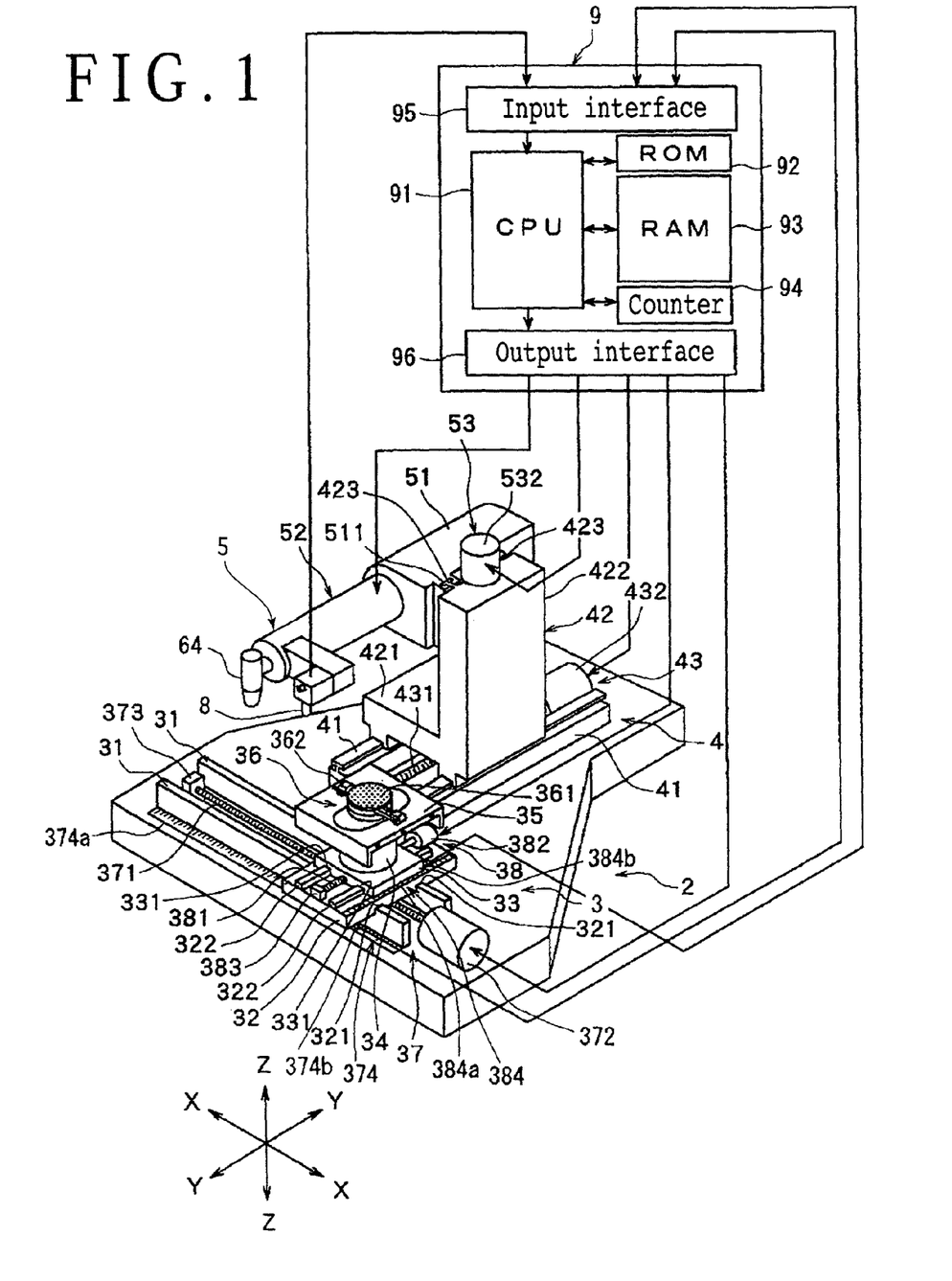
FIG. 1 is a perspective view of a laser processing machine configured according to the present invention.

Preferred embodiments of a laser processing machine configured according to the present invention will hereinafter be described in detail with reference to the accompanying drawings. FIG. 1 is a perspective view of the laser processing machine configured according to an embodiment of the present invention. The laser processing machine shown in FIG. 1 includes a stationary base 2, a chuck table mechanism 3, a laser beam irradiation unit support mechanism 4 and a laser beam irradiation unit 5. The chuck table mechanism 3 is mounted on the stationary base 2 so as to be movable in a process-transfer direction (the X-axial direction) indicated with arrow X and to hold a workpiece. The laser beam irradiation unit support mechanism 4 is mounted on the stationary base 2 so as to be movable in an indexing-transfer direction (the Y-axial direction) indicated with arrow Y perpendicular to the direction (the X-axial direction) indicated with arrow X. The laser beam irradiation unit 5 is mounted on the laser beam unit support mechanism 4 so as to be movable in the direction (the Z-axial direction) indicated with arrow Z.

The chuck table mechanism 3 includes a pair of guide rails 31, 31, a first slide block 32, a second slide block 33, a cover table 35 and a chuck table 36 as workpiece holding means. The guide rails 31, 31 are mounted on the stationary base 2 so as to be parallel to each other along the process-transfer direction (the X-axial direction) indicated with arrow X. The first slide block 32 is mounted on the guide rails 31, 31 so as to be movable in the process-transfer direction (the X-axial direction) indicated with arrow X. The second slide block 33 is mounted on the first slide block 32 so as to be movable in the indexing-transfer direction (the Y-axial direction) indicated with arrow Y. The cover table 35 is supported above the second slide block 33 by a cylindrical member 34. The chuck table 36 mentioned earlier is provided with a suction chuck 361 made of a porous material and is designed to hold e.g. a disklike semiconductor wafer, a workpiece, on the suction chuck 361 by suction means not shown. The chuck table 36 thus configured is turned by a pulse motor not shown disposed in the cylindrical member 34. Incidentally, the chuck table 36 is attached with clamps 362 for securing an annular frame described later.

The first slide block 32 is provided on a lower surface with a pair of to-be-guided grooves 321, 321 fitted to the pair of guide rails 31, 31 and also on an upper surface with a pair of guide rails 322, 322 formed to extend parallel to the indexing-transfer direction indicated with arrow Y. Since the to-be-guided grooves 321, 321 are fitted to the pair of guide rails 31, 31, the first slide block 32 configured described above can be moved along the pair of guide rails 31, 31 in the process-transfer direction indicated with arrow X. The chuck table mechanism 3 is provided with process-transfer means 37 for moving the first slide block 32 along the pair of guide rails 31, 31 in the process-transfer direction indicated with arrow X.

The process-transfer means 37 includes an external thread rod 371 disposed between and parallel to the pair of guide rails 31, 31 and a drive source such as a pulse motor 372 for turnably driving the external thread rod 371. The external thread rod 371 has one end turnably supported by a bearing block 373 secured to the stationary base 2 and the other end connected for transmission to the output shaft of the pulse motor 372. Incidentally, the external thread rod 371 is threadedly engaged with a through-internal screw hole formed in an internal thread block, not shown, provided to protrude from the central lower surface of the first slide block 32. In this way, the external thread rod 371 is normally or reversely turned by the pulse motor 372 to move the first slide block 32 along the guide rails 31, 31 in the process-transfer direction indicated with arrow X.

The laser processing machine in the illustrated embodiment includes process-transfer amount detection means 374 for detecting the process-transfer amount of the chuck table 36. The process-transfer amount detection means 374 includes a linear scale 374a disposed along the guide rails 31; and a read head 374b mounted on the first slide block 32 so as to move together with the first slide block 32 along the linear scale 374a. The read head 374b of the transfer amount detection means 374 sends a pulse signal of one pulse per μm to control means described later in the present embodiment. The control means described later detects the process-transfer amount of the chuck table 36 by counting pulse signals received. Thus, the process-transfer amount detection means 374 functions as X-axial direction detecting means for detecting the X-axial position of the chuck table 36.

If a pulse motor 372 is used as the drive source of the process-transfer means 37, the process-transfer amount of the chuck table 36 can be detected by counting the drive pulse of the control means described later which outputs a drive signal to the pulse motor 372. If a servo motor is used as the drive source of the process-transfer means 37, the process-transfer amount of the chuck table 36 can be detected by sending a pulse signal outputted by a rotary encoder which detects the rotation number of the servo motor, to the control means and counting the pulse signal received by the control means.

The second slide block 33 is provided on a lower surface with a pair of to-be-guided grooves 331, 331 fitted to the pair of guide rails 322, 322 provided on the upper surface of the first slide blocks 32. Since the to-be-guided grooves 331, 331 are fitted to the pair of guide rails 322, 322, the second slide block 33 can be moved in the indexing-transfer direction (the Y-axial direction) indicated with arrow Y. The chuck table mechanism 3 is provided with first indexing-transfer means 38 for moving the second slide block 33 in the indexing-transfer direction (the Y-axial direction) indicated with arrow Y along the pair of guide rails 322, 322 provided on the first slide block 32.

The first indexing-transfer means 38 includes an external thread rod 371 disposed between and parallel to the pair of guide rails 322, 322; and a drive source such as a pulse motor 372 or the like for turnably driving the external thread rod 371. The external thread rod 371 has one end turnably supported by a bearing block 383 secured to the upper surface of the first slide block 32 and the other end transmission-connected to the output shaft of the pulse motor 372. Incidentally, the external thread rod 371 is threadedly engaged with a through-internal screw hole formed in an internal thread block, not shown, provided to protrude form the central lower surface of the second slide block 33. In this way, the external thread rod 371 is normally or reversely turned by the pulse motor 372 to move the second slide block 33 along the guide rails 322, 322 in the indexing-transfer direction indicated with arrow Y.

The laser processing machine of the illustrated embodiment includes indexing-transfer amount detection means 384 for detecting the indexing-transfer amount of the second slide block 33. The indexing-transfer amount detection means 384 includes a linear scale 384a disposed along the guide rails 322; and a read head 384b mounted on the second slide block 33 so as to move together with the second slide block 33 along the linear scale 384a. The read head 384b of the transfer amount detection means 384 sends a pulse signal of one pulse per μm to the control means described later in the illustrated embodiment. The control means described later detects the indexing-transfer amount of the chuck table 36 by counting pulse signals received. Thus, the indexing-transfer amount detection means 384 functions as Y-axial position detecting means for detecting the Y-axial position of the chuck table 36.

If a pulse motor 372 is used as the drive source of the process-transfer means 38, the indexing-transfer amount of the chuck table 36 can be detected by counting the drive pulse of the control means which outputs a drive signal to the pulse motor 372. If a servo motor is used as the drive source of the first indexing-transfer means 38, the indexing-transfer amount of the chuck table 36 can be detected by sending a pulse signal outputted by a rotary encoder which detects the rotation number of the servo motor, to the control means described later and counting the pulse signal received by the control means.

The laser beam irradiation unit support mechanism 4 includes a pair of guide rails 41, 41 disposed on the stationary base 2 so as to be parallel to and along the indexing-transfer direction (the Y-axial direction) indicated with arrow Y; and a movable support base 42 disposed on the guide rails 41, 41 to be movable in the direction indicated with arrow Y. The movable support base 42 includes a moving support portion 421 movably mounted on the guide rails 41, 41; and an attachment portion 422 mounted to the moving support portion 421. The attachment portion 422 is provided on its lateral surface with a pair of guide rails 423, 423 parallelly extending in the direction (the Z-axial direction) indicated with arrow Z. The laser beam irradiation unit support mechanism 4 is equipped with a second indexing-transfer means 43 for moving the movable support base 42 along the pair of guide rails 41, 41 in the indexing-transfer direction (the Y-axial direction) indicated with arrow Y.

The second indexing-transfer means 43 includes an external thread rod 431 disposed between and parallel to the pair of guide rails 41, 41 and a drive source such as a pulse motor 432 adapted to turnably driving the external thread rod 431. One end of the external thread rod 431 is turnably supported by a bearing block not shown secured to the stationary base 2 and the other end is connected for transmission to the output shaft of the pulse motor 432. Incidentally, the external thread rod 431 is threadedly engaged with an internal screw hole formed in an internal screw block not shown provided to project from a central lower surface of the moving support portion 421 constituting part of the movable support base 42. Thus, the external thread rod 431 is normally or reversely turned by the pulse motor 432 to move the movable support base 42 along the guide rails 41, 41 in the indexing-transfer direction (the Y-axial direction) indicated with arrow Y.

The laser beam irradiation unit 5 includes a unit holder 51; and a cylindrical casing 52 attached to the unit holder 51 to house laser beam irradiation means described later. The unit holder 51 is provided with a pair of to-be-guided grooves 511, 511 slidably fitted to the pair of guide rails 423, 423 provided on the attachment portion 422. The unit holder 51 is supported movably in the direction (the Z-axial direction) indicated with arrow Z by fitting the respective to-be-guided grooves 511, 511 to the guide rails 423, 423.

The laser beam irradiation unit 5 is equipped with moving means 53 for moving the unit holder 51 along the pair of guide rails 423, 423 in the direction (the Z-axial direction) indicated with arrow Z. The moving means 53 includes an external thread rod (not shown) disposed between the pair of guide rails 423, 423 and a drive source such as a pulse motor 532 for turnably driving the external thread rod. The external thread rod not shown is normally or reversely turned by the pulse motor 532 to move the unit holder 51 and the casing 52 housing the laser beam irradiation means described later along the guide rails 423, 423 in the direction (the Z-axial direction) indicated with arrow Z. Incidentally, in the illustrated embodiment, the pulse motor 532 is normally turned to move the casing 52 housing the laser beam irradiation means upward and reversely turned to move it downward.

Figure 2:
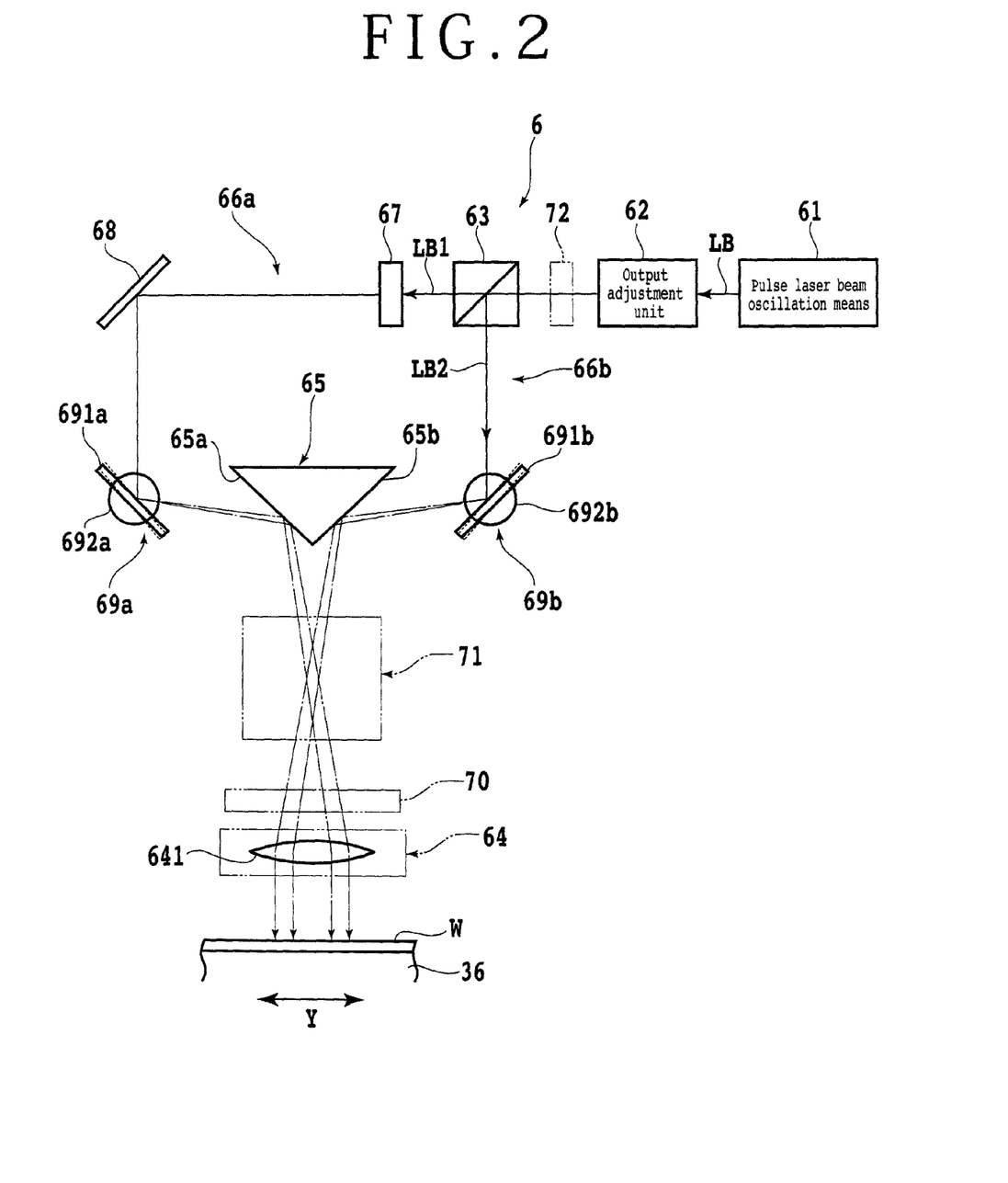
FIG. 2 is a schematic block diagram illustrating a configuration of laser beam irradiation means installed in the laser beam processing machine shown in FIG. 1.

A description is given of the laser beam irradiation means housed in the cylindrical casing 52 with reference to FIG. 2. The laser beam irradiation means 6 shown in FIG. 2 includes pulse laser beam oscillation means 61, an output adjustment unit 62 and a beam splitter 63. The pulse laser beam oscillation means 61 includes an YVO4 pulse laser oscillator or YAG laser oscillator which emits a pulse laser beam. The output adjustment unit 62 adjusts the output power of the pulse laser beam emitted from the pulse laser beam oscillation means 61. The beam splitter 63 is adapted to split the pulse laser beam whose output power is adjusted by the output adjustment unit 62 into a first laser beam LB1 with a first polarization plane and a second laser beam LB2 with a second polarization plane. The first laser beam LB1 split by the beam splitter 63 has the first polarization plane corresponding to e.g. a P-wave and the second laser beam LB2 has the second polarization plane corresponding to e.g. an S-wave.

The laser beam irradiation means 6 shown in FIG. 2 includes a condenser 64 provided with a condenser lens 641 and a prism 65. The condenser 64 is adapted to condense the first and second laser beams LB1, LB2 split by the beam splitter 63 and direct them to a workpiece W held on the chuck table 36. The prism 65 is adapted to reflect, toward the condenser lens 641, the first and second laser beams LB1, LB2 split by the beam splitter 63 disposed between the beam splitter 63 and the condenser lens 641. The prism 65 has a first reflecting plane 65a adapted to totally reflect and direct the first laser beam LB1 toward the condenser lens 641 and a second reflecting plane 65b adapted to totally reflect and direct the second laser beam LB2 toward the condenser lens 641.

A first optical path 66a is adapted to direct the first laser beam LB1 split by the beam splitter 63 to the prism 65. A half-wave plate 67, a direction-changing mirror 68 and first angle-changing mirror means 69a are arranged on the first optical path 66a. The half-wave plate 67 is adapted to allow the direction of the polarization plane of the first laser beam LB1 split by the beam splitter 63 to be aligned with the direction of the polarization plane of the second laser beam LB2. The direction-changing mirror 68 is adapted to change at 90 degrees the direction of the first laser beam LB1 in which the direction of the polarization plane was polarized by the half-wave plate 67 to be aligned with that of the second laser beam LB2. The first angle-changing mirror means 69a is adapted to change the angle through which the first laser beam LB1 whose direction was changed by the direction-changing mirror 68 is directed to the prism 65. The half-wave plate 67 may be disposed on the second optical path 66b adapted to direct to the prism 65 the second laser beam LB2 split by the beam splitter 63. In this case, the direction of the polarization plane of the second laser beam LB2 split by the beam splitter 63 is allowed to be aligned with that of the first laser beam LB1.

The first angle-changing mirror means 69a is composed of a reflecting mirror 691a and an actuator 692a adapted to change the installation angle of the reflecting mirror 691a. The actuator 692a is actuated to thereby change the installation angle in a range from the position indicated with a solid line to the position indicated with a broken line. Thus, the first laser beam LB1 split by the beam splitter 63 is directed to the prism 65 in a range indicated with a chain line and a two-dotted chain line. The second optical path 66b is adapted to direct the second laser beam LB2 split by the beam splitter 63 to the prism 65. A second angle-changing mirror means 69b for changing the angle through which the second laser beam LB1 split by the beam splitter 63 is directed to the prism 65 is disposed on the second optical path 66b. As with the first angle-changing mirror means 69a, the second angle-changing mirror means 69b includes a reflecting mirror 691b and an actuator 692b for changing the installation angle of the reflecting mirror 691b. The actuator 692b is actuated to change the installation angle in a range from the position indicated with a solid line to the position indicated with a broken line. Thus, the second laser beam LB2 split by the beam splitter 63 is directed to the prism 65 in the range indicated with the chain line and the two-dotted chain line.

The laser beam irradiation means 6 shown in FIG. 2 is configured as described above and its operation is next described. The pulse laser beam LB emitted from the pulse laser beam oscillation means 61 is adjusted by the output adjustment unit 62 to have a predetermined output level and enters the beam splitter 63. The pulse laser beam LB entering the beam splitter 63 is split thereby into the first laser beam LB1 and the second laser beam LB2. The first laser beam LB1 split by the beam splitter 63 so as to propagate along the first optical path 66a passes through the half-wave plate 67 while the direction of the polarization plane is turned to be aligned with that of the second laser beam LB2. Then, it is directed to the condenser lens 641 of the condenser 64 via the reflecting mirror 691a of the first angle-changing mirror means 69a and via the prism 65. The first laser beam LB1 is condensed by the condenser lens 641 and directed to the workpiece W held on the chuck table 36. In this case, the actuator 692a of the first angle-changing mirror means 69a is actuated to change the installation angle of the reflecting mirror 691a from the position indicated with the solid line to the position indicated with the broken line. This can allow the first laser beam LB1 to move in the Y-axial direction in the range indicated with the chain line and the two-dotted chain line.

On the other hand, the second laser beam LB2 split by the beam splitter 63 to propagate along the second optical path 66b is directed to the condenser lens 641 of the condenser 64 via the reflecting mirror 691b of the second angle-changing mirror means 69b and via the prism 65, condensed by the condenser lens 641 and then directed to the workpiece W held on the chuck table 36. In this case, the actuator 692b of the second angle-changing mirror means 69b is actuated to change the installation angle of the reflecting mirror 691b from the position indicated with the solid line to the position indicated with the broken line. This can allow the second laser beam LB2 to move in the Y-axial direction in the range indicated with the chain line and the two-dotted chain line. Thus, in the laser beam irradiation means 6 shown in FIG. 2, the irradiation interval of the first laser beam LB1 can be changed in the Y-axial direction by changing the installation angle of the reflecting mirror 691a of the first angle-changing mirror means 69a.

Similarly, the irradiation interval of the second laser beam LB2 can be changed in the Y-axial direction by changing the installation angle of the reflecting mirror 691b of the second angle-changing mirror means 69b. In addition, the direction of the polarization plane of the first laser beam LB1 split by the beam splitter 63 is allowed to be aligned with that of the second laser beam LB2 by the half-wave plate 67. The first and second laser beams LB1, LB2 directed to the workpiece W held on the chuck table 36 have the same machining performance. Thus, the same two pieces of processing can simultaneously be performed.

Incidentally, it is desirable that the laser beam irradiation means 6 described above include a rotary half-wave plate 70 disposed between the prism 65 and the condenser 64 as shown in FIG. 2. This rotary half-wave plate 70 is adapted to adjust the respective directions of the polarization planes of the first and second laser beams LB1, LB2 so as to be suited to the material of the workpiece W held on the chuck table 36. In addition, it is desirable that the laser beam irradiation means 6 include optical path length-changing means 71 disposed between the prism 65 and the condenser 64. The optical path length-changing means 71 can further change the respective Y-axial irradiation intervals of the first and second laser beams LB1, LB2 by changing the respective optical path lengths of the first and second laser beams LB1, LB2 directed by the prism 65, in combination of the respective functions of the first and second angle-changing mirror means 69a, 69b. Further, it is desirable that the laser beam irradiation means 6 include a rotary half-wave plate 72 disposed between the pulse laser beam oscillation means 61 and the beam splitter 63. This half-wave plate 72 is adapted to adjust the direction of the polarization plane of the pulse laser beam emitted from the laser beam irradiation means 6 so as to be aligned with the direction of the polarization plane of the beam splitter 63.

A further description is given referring again to FIG. 1. Imaging means 8 is attached to the leading end of the casing 52 housing the laser beam irradiation means 6 in order to detect a process area to be laser-processed by the laser beam irradiation means 6. The imaging means 8 is configured to include infrared illumination means which emits an infrared ray to a workpiece; an optical system which captures the infrared ray emitted from the infrared illumination means; and an image pickup device (infrared CCD) which outputs an electric signal corresponding to the infrared ray captured by the optical system; as well as a usual image pickup device (CCD) picks up an image through a visible ray. The imaging means sends a picture signal of the picked-up image to the control means described later.

The laser processing machine of the illustrated embodiment is equipped with control means 9, which is composed of a computer. The control means 9 includes a central processing unit (CPU) 91 which performs arithmetic processing according to a control program; a read-only memory (ROM) 92 for storing the control program and the like; a readable and writable random access memory (RAM) 93 for storing calculation results and the like; a counter 94; and an input interface 95 and an output interface 96. The input interface 95 of the control means 9 is adapted to receive detection signals from the transfer-amount detection means 374, the imaging means 8 and the like. The output interface 96 of the control means 9 is adapted to output control signals to the pulse motors 372, 382, 432 and 532 mentioned above, the actuator 692a constituting part of the first angle-changing mirror means 69a of the laser beam irradiation means 6, the actuator 692b constituting part of the second angle-changing mirror means 69b, the rotary half-wave plate 70, the optical path length-changing means 71, the rotary half-wave plate 72 and the like.

Figure 3:
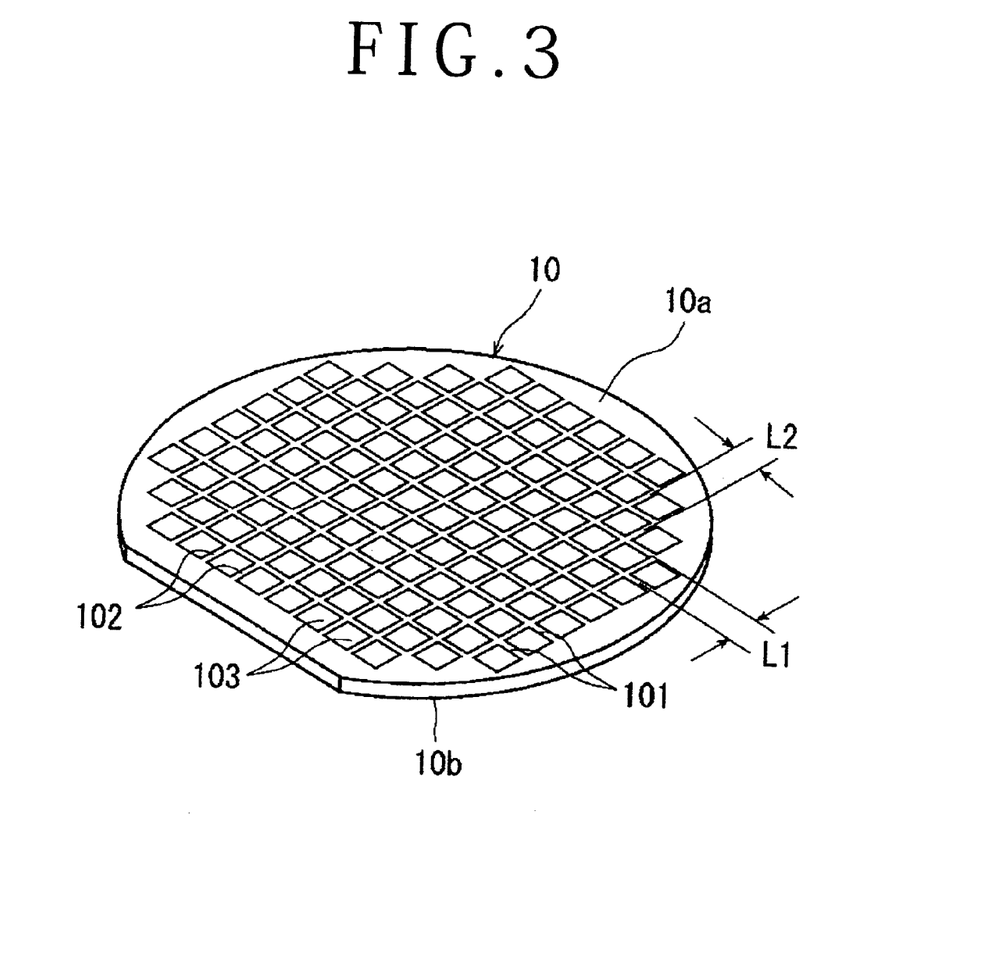
FIG. 3 is a perspective view of an optical device wafer as a workpiece.
Figure 4:
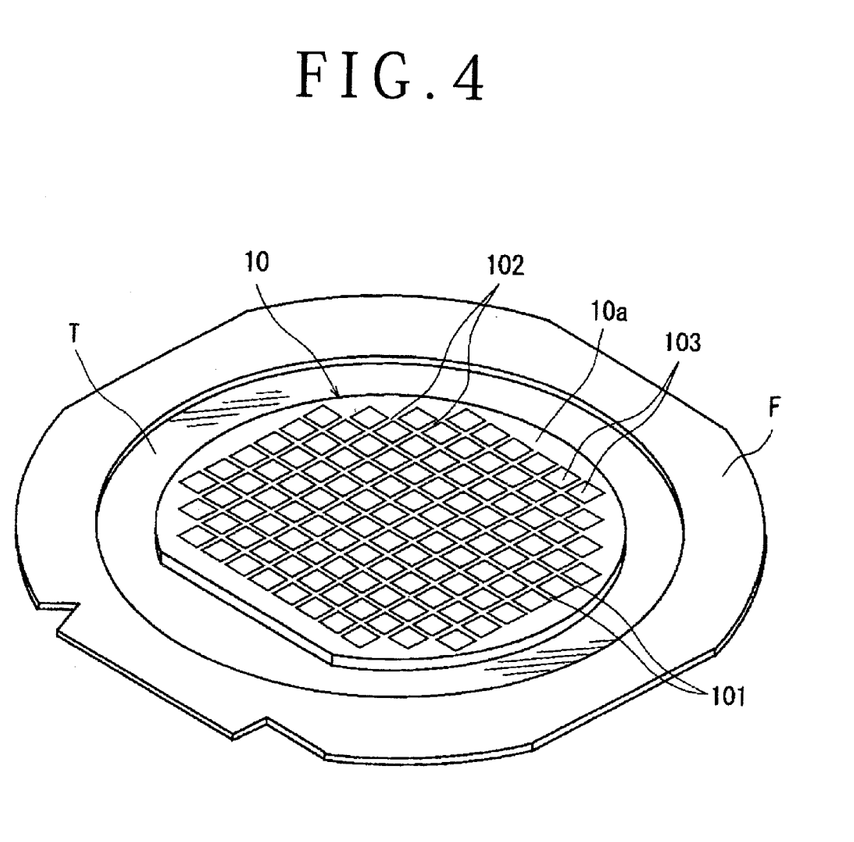
FIG. 4 is a perspective view illustrating a state where the optical device wafer shown in FIG. 3 is stuck to the front surface of a protection tape attached to an annular frame.

The laser processing machine of the present embodiment is configured as above. The operation of the laser processing machine will be described below. FIG. 3 is a perspective view of an optical device wafer 10 as a workpiece to be laser-processed by the laser machining machine described above. The optical device wafer 10 shown in FIG. 3 is such that a functional layer including a nitride semiconductor layer is formed on the front surface of a sapphire substrate with a thickness of e.g. 90 µm. The optical device wafer 10 is formed on the front surface 10a with a plurality of rectangular areas sectioned by a plurality of first streets 101 and of second streets 102 arranged in a lattice pattern. Devices 103 composed of light-emitting diodes (LEDs) are formed in the rectangular areas. Incidentally, an interval L1 between the adjacent first streets 101 and an interval L2 between the adjacent second streets 102 are received by the control means 9 and specifically stored in the random access memory (RAM) 93. The optical device wafer 10 thus formed is stuck to a protection tape T with the rear surface 10b thereof facing downward as shown in FIG. 4. The protection tape T is made of a synthetic resin sheet such as a polyolefin sheet or the like and attached to an annular frame F. Thus, the front surface 10a of the optical device wafer 10 faces upward.

The optical device wafer 10 supported by the annular frame F via the protection tape T as shown in FIG. 4 is placed on the chuck table 36 of the laser processing machine shown in FIG. 1 with the protection tape T facing downward. The optical device wafer 10 is suck and held on the chuck table 36 via the protection tape T by actuating suction means not shown. The annular frame F is secured by clamps 362.

The chuck table 36 that has sucked and held the semiconductor wafer 10 as described above is located at a position immediately below the imaging means 8 by the process-transfer means 37. After the chuck table 36 is located at a position immediately below the imaging means 8, alignment operation is executed in which the imaging means 8 and control means 9 detect a process area of the optical device wafer 10 to be laser-processed. More specifically, the imaging means 8 and control means 9 execute image processing such as pattern matching for positioning between the first streets 101 formed to extend in the predetermined direction of the optical device wafer 10 and the condenser 64 of the laser beam irradiation means 6 for applying a laser beam along the first streets 101, thus executing alignment of a laser beam irradiation position. Similarly, the alignment of a laser beam irradiation position is executed on the second streets 102 formed on the optical device wafer 10.

Figure 5A:
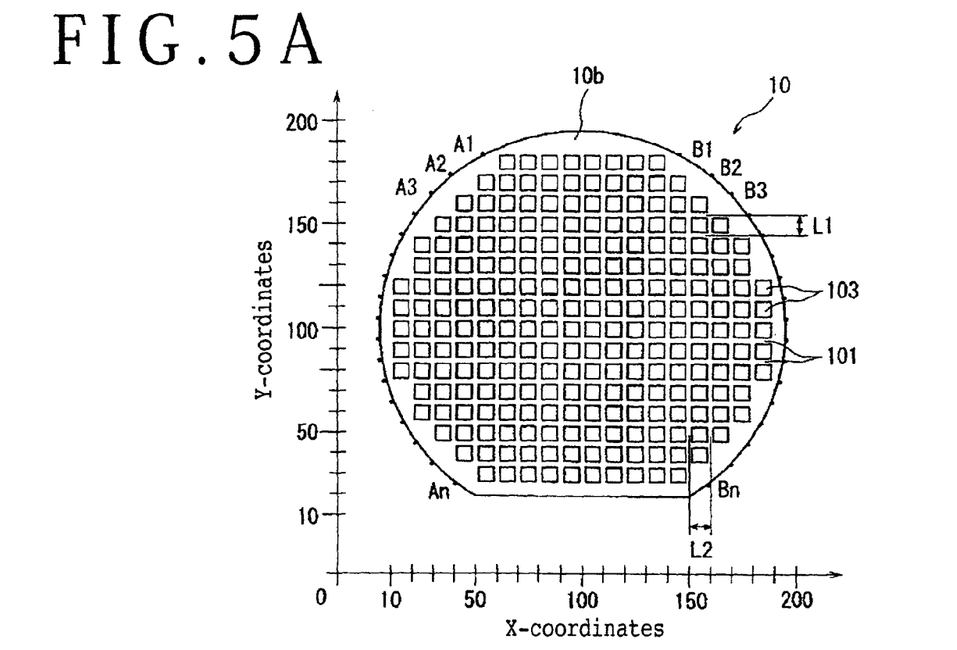
FIGS. 5A and 5B are diagrams for assistance in explaining the relationship between coordinates and the semiconductor wafer shown in FIG. 3 which is held in place on the chuck table of the laser processing machine shown in FIG. 1.
Figure 5B:
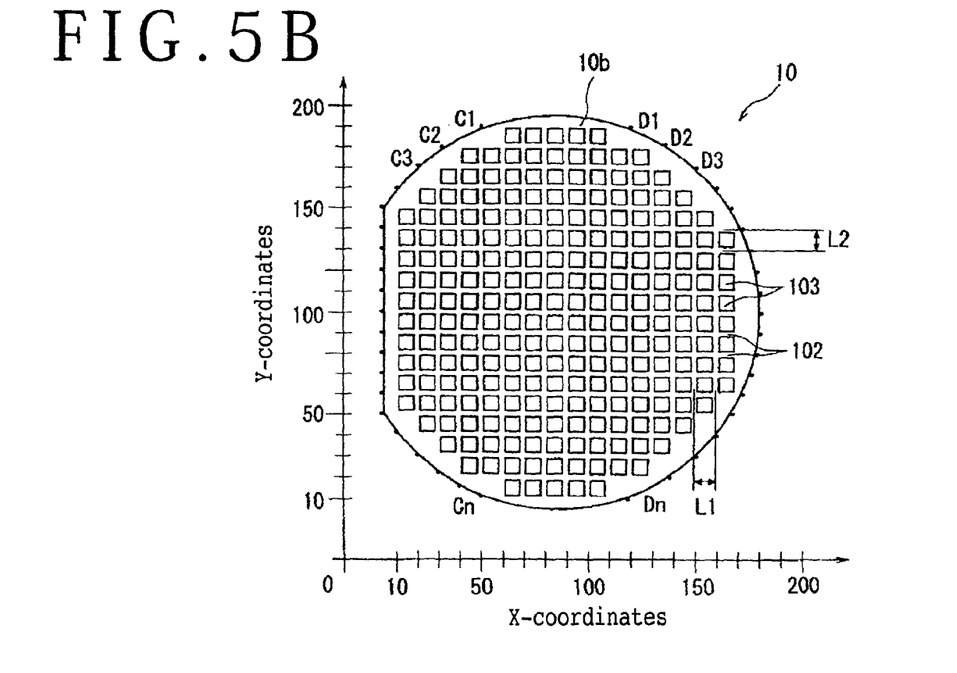

If the alignment described above is executed, the optical device wafer 10 on the chuck table 36 is located at the coordinates-position shown in FIG. 5A. Incidentally, FIG. 5B illustrates the chuck table 36, i.e., the optical device wafer 10 turned at an angle of 90 degrees from the state shown in FIG. 5A.

Figure 6:
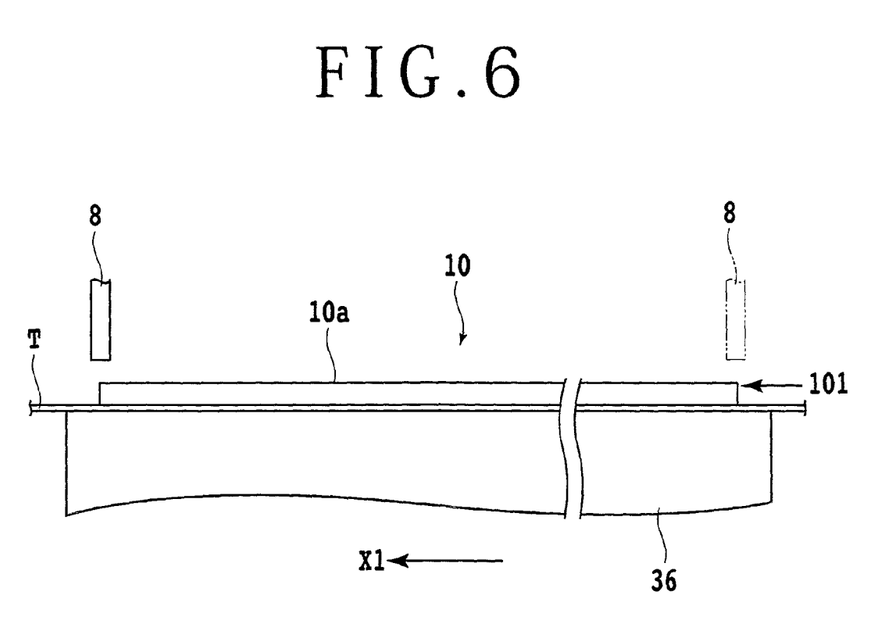
FIG. 6 is an explanatory diagram of a street detection step executed by the laser processing machine shown in FIG. 1.

As described above, the alignment of the laser beam irradiation position is executed by detecting the first and second streets 101, 102 formed on the optical device wafer 10 held on the chuck table 36. Thereafter, the chuck table 36 is moved to locate an uppermost first street 101 of the first streets 101 at a position immediately below the imaging means 8 in the state of FIG. 5A. One end of the first street 101 (the left end in FIG. 6) is further located at a position immediately below the imaging means 8 as shown in FIG. 6. In this state if the imaging means 8 detects one end (the left end in FIG. 6) of the first street 101, it sends its coordinate value (A1 in FIG. 5A) as a process-transfer start position coordinate value to the control means 9. Next, the chuck table 36 is moved in the direction indicated with arrow X1 in FIG. 6 to locate the other end (the right end in FIG. 6) of the first street 101 at a position immediately below the imaging means 8. In this state if the imaging means 8 detects the other end (the right end in FIG. 6) of the first street 101, it sends its coordinate value (B1 in FIG. 5A) as a process-transfer termination coordinate value (B1) to the control means 9. The control means 9 temporarily stores the process-transfer start coordinate value (A1) and the process-transfer termination position coordinate value (B1) in the random access memory (RAM) 93 (the street detection step).

In this way, the respective coordinate values of the process-transfer start position, cross-points and the process-point termination position of the upper-most first street 101 in FIG. 5A are detected. After this detection, the chuck table 36 is indexing-transferred in the Y-axial direction by the interval L1 of the first street 101 so that the first street 101 that is second from the uppermost one is located at a position immediately below the imaging means 8. The street detection step described above is executed on the first street 101 that is second from the uppermost one to detect the process-transfer start position coordinate value (A2) and the process-transfer termination position coordinate position (B2), which are temporarily stored in the random access memory (RAM) 93.

Thereafter, the indexing-transfer and the street detection step described above are repeatedly performed until the lowermost first street 101 is reached in FIG. 5A to detect the process-transfer start position coordinate values (A3-An) and process-transfer termination position coordinate values (B3-Bn) of the first streets 101, which are temporarily stored in the random access memory (RAM) 103.

After the street detection step is executed on the first streets 101 as described above, the chuck table 36, thus the optical device wafer 10, is turned at an angle of 90 degrees and positioned as in FIG. 5B. Next, the street detection step described above is performed on the second streets 102 to detect the process-transfer start position coordinate values (C1-Cn) and process-transfer termination position coordinate values (D1-Dn), which are temporarily stored in the random access memory (RAM) 103.

Incidentally, the street detection step described above may be omitted by preliminarily storing the design values of the optical device wafer 10 in the read-only memory (ROM) 92 or in the random access memory (RAM) 93. Such design values include the process-transfer start position coordinate values (A1-An) and process-transfer termination coordinate values (B1-Bn) of the first streets 101 formed on the optical device wafer 10 and the process-transfer start position coordinate values (C1-Cn) and process-transfer termination coordinate values (D1-Dn) of the second streets 102.

Next, a process-groove forming step is executed in which pulse laser beams are applied to the optical device wafer 10 along the first and second streets 101, 102 formed thereon to form laser processing grooves on the optical device wafer 10. Incidentally, when the process-groove forming step is executed, the control means 9 controls the actuator 692$a$ constituting part of the first angle-changing mirror means 69$a$ of the laser beam irradiation means 6 and the actuator 692$b$ constituting part of the second angle-changing mirror means 69$b$ to adjust the Y-axial irradiation interval between the first laser beam LB1 and the second laser beam LB2 to the interval L1 of the first streets 101.

Figure 7:
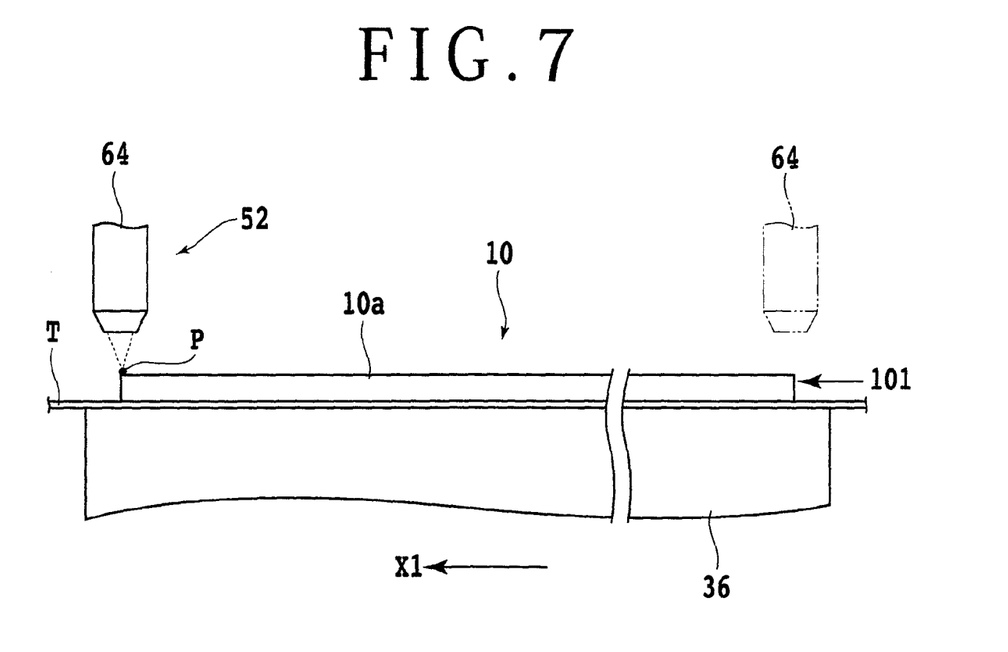
FIG. 7 is an explanatory diagram of a process-groove forming step executed by the laser processing machine shown in FIG. 1.

In the process-groove forming step, the chuck table 36 is first moved so that the middle between the uppermost first street 101 and the first street 101 that is second from the uppermost one is located at a position immediately below the condenser 64 of the laser beam irradiation means 6. As shown in FIG. 7, one end (the left end in FIG. 7) of the middle between the uppermost first street 101 and the first street 101 that is second from the uppermost one is located at a position immediately below the condenser 64. The middle between the uppermost first street 101 and the first street 101 that is second from the uppermost one is located at a position immediately below the condenser 8 as described above. Thus, the first laser beam LB1 is to be applied along the uppermost first street 101 from the condenser 64 of the laser beam irradiation means 6 and the second laser beam LB2 is to be applied along the first street 101 that is second from the uppermost first street 101. The respective focused points P of the first and second laser beams LB1, LB2 emitted from the condenser 64 are focused on the vicinity of the front surface 10$a$ (the upper surface) of the optical device wafer 10.

Figure 8:
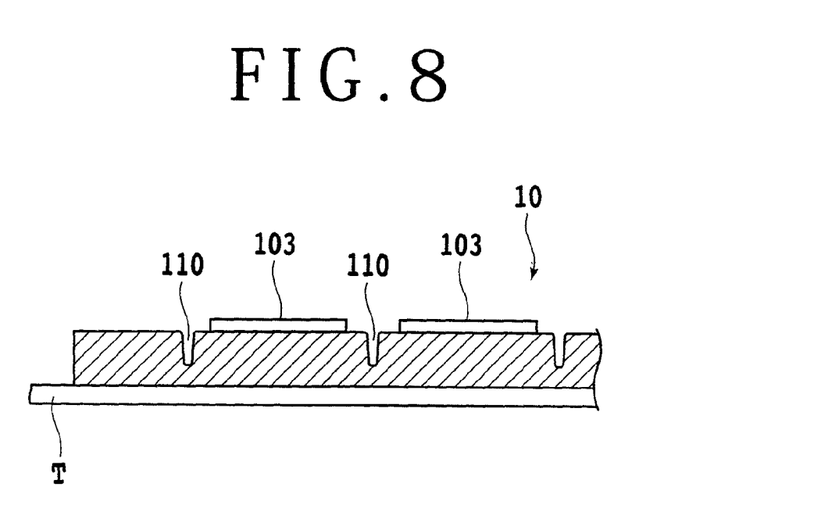
FIG. 8 is a cross-sectional view of an optical device wafer in which the laser-process grooves are formed by the process-groove forming step shown in FIG. 7.

Next, the control means 9 actuates the process-transfer means 37 to process-transfer the chuck table 36 in the direction indicated with arrow X1 in FIG. 7 while actuating the pulse laser beam oscillation means 61 of the laser beam irradiation means 6 to emit a laser beam with a wavelength that can pass through the optical device wafer 10. As a result, the first and second laser beams LB1 and LB2 emitted from the condenser 64 of the laser beam irradiation means 6 are applied along the uppermost first street 101 and along the first street 101 that is second from the uppermost one, respectively. When the other end (the right end in FIG. 7) of the first street 101 reaches the irradiation position of the condenser 64 of the laser beam irradiation means 6, the irradiation of the pulse laser beam is stopped and also the process-transfer of the chuck table 36 is stopped. As a result, the optical device wafer 10 is formed with laser processing grooves 110, 110 extending along two first streets 101 as shown in FIG. 8. In this way, the laser processing machine described above can concurrently form the laser processing grooves along the two streets. Therefore, productivity can be enhanced. In addition, the first laser beam LB1 split by the beam splitter 63 can be allowed by the half-wave plate 67 to have the direction of the polarization plane aligned with that of the second laser beam LB2. The first and second laser beams LB1, LB2 have the same machining performance. Thus, the same two pieces of processing can simultaneously be executed.

Incidentally, the processing conditions of the process-groove forming step are set, for example, as follows:

| Light source | YAG laser |
| Wavelength | 355 nm |
| Cyclic frequency | 10 kHz |
| Average output | 2 W |
| Cyclic frequency | 50 kHz |
| Focused light spot diameter | 10 μm |
| Process-transfer rate | 150 mm/sec |

As described above, the laser processing grooves 110, 110 are formed to extend along the two first streets 101. Thereafter, the chuck table 36 is indexing-transferred in the direction indicated with arrow Y two times the interval L1 of the first street 101 and the process-groove forming step is executed. Similarly, the process-groove forming step is afterward executed on the other first streets 101 formed on the optical device wafer 10. Next, the chuck table 36 is turned at an angle of 90 degrees and the process-groove forming step is executed on the second streets 102 formed on the optical device wafer 10.

The process-groove forming step as described above is executed on the optical device wafer 10 along all the first and second streets 101, 102 formed thereon. Thereafter, the optical device wafer 10 is conveyed to a wafer-dividing device which divides the optical device wafer 10 along the laser processing grooves 110 formed to extend along the first and second streets 101, 102.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing machine comprising:
a chuck table adapted to hold a workpiece;
laser beam irradiation means for applying a laser beam to the workpiece held by the chuck table; and
process-transfer means for relatively process-transferring the chuck table and the laser beam irradiation means;
wherein said laser beam irradiation means includes
laser beam oscillation means for emitting a laser beam,
a beam splitter adapted to split the laser beam emitted from the laser beam oscillation means into a first laser beam having a first polarization plane and a second laser beam having a second polarization plane perpendicular to the first polarization plane,
a condenser lens adapted to condense the first and second laser beams split by the beam splitter,
a prism disposed between the beam splitter and the condenser lens to separately reflect the first and second laser beams split by the beam splitter toward the condenser lens, said prism having a first reflecting plane and a second reflecting plane,
first angle-changing mirror means disposed on a first optical path adapted to lead the first laser beam toward the prism and to change an angle of the first laser beam incident on the prism,
second angle-changing mirror means disposed on a second optical path adapted to lead the second laser beam toward the prism and to change an angle of the second laser beam incident on to the prism, and
a half-wave plate disposed in the first or second optical path to allow one of respective directions of the first and second polarization planes to be aligned with the other of the directions of the first and second polarization planes,
wherein the first laser beam having the first polarization plane is incident on the first reflecting plane of the prism and the second laser beam having the second polarization plane is incident on the second reflecting plane of the prism.

2. The laser processing machine according to claim 1, further comprising a rotary half-wave plate disposed between the prism and the condenser lens.

* * * * *